H. S. NUNAMAKER.
VEHICLE TIRE.
APPLICATION FILED SEPT. 25, 1913.
1,126,840.
Patented Feb. 2, 1915.
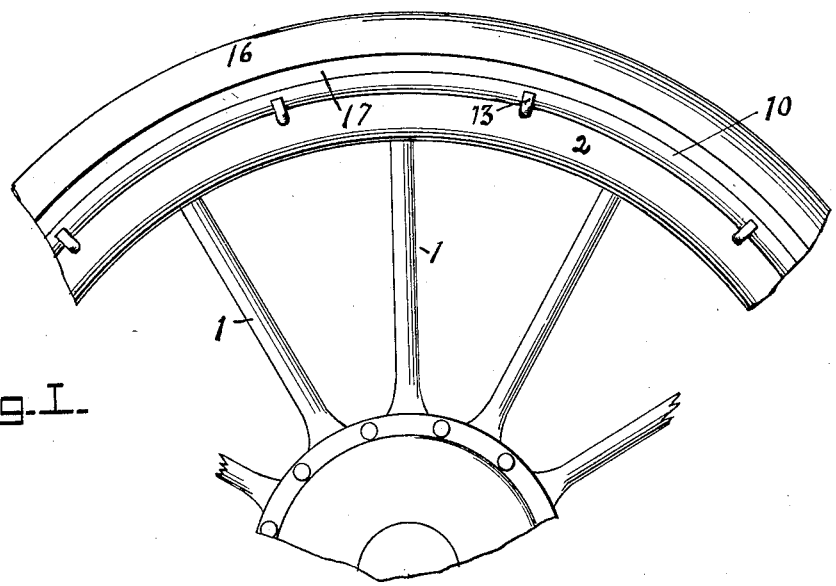
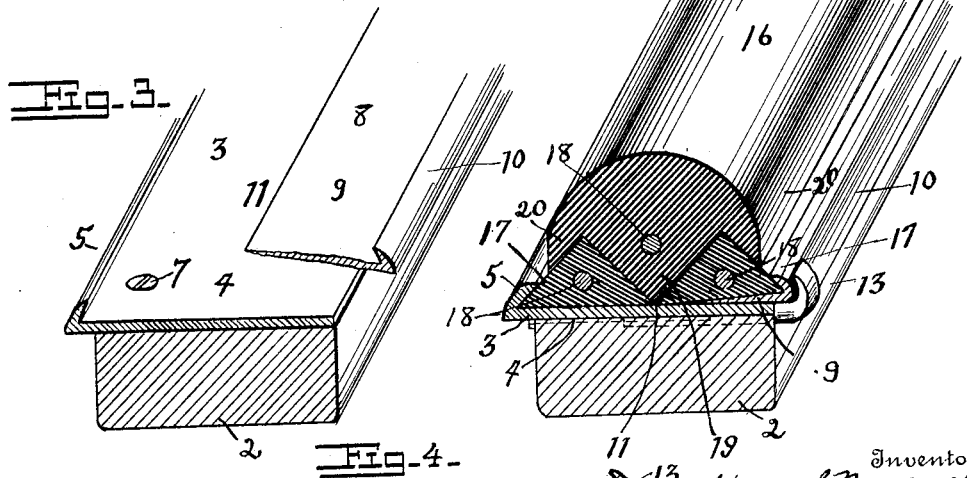
Witnesses
E. S. Hall.
Hazel Owen.
Inventor
Henry S. Nunamaker.
By
Bond & Miller
Attorneys.

UNITED STATES PATENT OFFICE.

HENRY S. NUNAMAKER, OF CLEVELAND, OHIO.

VEHICLE-TIRE.

1,126,840.   Specification of Letters Patent.   Patented Feb. 2, 1915.

Application filed September 25, 1913. Serial No. 791,704.

*To all whom it may concern:*

Be it known that I, HENRY S. NUNAMAKER, a citizen of the United States, residing at Cleveland, in the county of Cuyahoga and State of Ohio, have invented a new and useful Vehicle-Tire, of which the following is a specification.

My invention relates to improvements in vehicle tires and especially to cushion tires adapted for use on motor vehicles and the like.

The objects of the invention are to generally improve vehicle tires of the character mentioned, to provide a cushion tire made in a plurality of renewable parts, to so construct the tire that those parts subject to wear by contact with the road may be made of material most suitable to resist such wear, whereas other parts may be made of material more suited to produce a cushion effect.

Further objects are to provide for the convenient and ready connection and disconnection of said tires with relation to the wheel and for adjustment of the various parts so as to form a substantial and efficient tire adapted for hard usage under all conditions.

These objects, together with other objects readily apparent to those skilled in the art, may be attained by the construction illustrated in the accompanying drawings, although the invention may be embodied in other forms, the construction illustrated being chosen by way of example.

In the drawings Figure 1 is a side elevation of a portion of a vehicle wheel provided with a tire embodying my invention. Fig. 2 is a fragmentary view, partly in perspective and partly in cross section, of the felly, rim and tire. Fig. 3 is a similar view of the felly and rim only. Fig. 4 is a sectional view of one of the rim-clamping bolts.

Throughout the several views similar reference numerals indicate similar parts.

More specifically describing the construction disclosed in the drawings, the numeral 1 indicates the spokes and the numeral 2 the felly of the wheel. Upon the peripheral face of the felly 1 is arranged the rim, which is formed of two members, a fixed member 3 provided with the attaching base 4 extending across the peripheral face of the felly 2, and having at one of its outer edges the upturned retaining flange 5. Some means, as the screws 7, are provided for retaining the fixed member 5 in place upon the felly.

The adjustable member 8 is provided with a flat base portion 9 provided at its outer edge with the upturned retaining flange 10 and somewhat thinned or tapered at its inner edge 11. The inner edge 11 of the member 8 is adapted to overlie the base 4 of the member 3, as illustrated in Fig. 2, so that lateral adjustment of the member 8 with relation to the member 3 may be made without throwing the tire-bearing faces of the members 3 and 8 greatly out of alinement.

For the purpose of drawing the member 8 inwardly on the felly the rim-clamping bolts, such as illustrated in Fig. 4, are provided. Each bolt comprises a tubular member 12 provided with a hooked head 13, and a bolt member 14, provided with the head 15, is adapted to screw into the tubular member 12. The tubular member 12 extends through the felly from the outer side thereof, the hooked head 13 engaging the flange 10 of the member 8, and the bolt member 14 extends through the felly from the inner side thereof and is screwed into the member 12. The head 15 bearing against the inner face of the felly 2, the hooked head 13 may be drawn inwardly by screwing up the bolt 14, as will be well understood. A plurality of such clamping bolts should be employed, annularly spaced from each other about the felly, substantially as illustrated in Fig. 1.

The resilient portion of the tire comprises a tread member 16, preferably formed of a rubber compound which is tough and well adapted to withstand the wear and tear of contact with the road while possessing resilient and cushion properties also, to a degree, and the base members 17, preferably formed of a compound, which is harder than, though resilient, and not necessarily so tough as the tread member. Each of the members 16 and 17 extends entirely around the wheel, being preferably provided with the retaining wires 18 embedded in the midst of each of said members, in accordance with the common and well known practice in cushion tires.

It will be especially noted that each of the members 17 is of triangular prism form, and is arranged with one of its faces seated upon the rim, and two of its faces outwardly disposed. The two members 17 are arranged side by side with their respective outer angular edges engaged by the flanges 5 and 10 and with their inner respective angular edges substantially in engagement with each other. The other, free angular edges of the said two members are thus spaced from each other, and the faces between said spaced edges and the inner, substantially engaged angular edges form an angular valley extending entirely around the wheel.

The tread member 16 in the construction illustrated is of greater cross sectional area than either of the members 17 and such, in fact, is the construction usually to be preferred. The tread face of the member may be curved, as illustrated in the drawings, or of any other shape or contour, either roughened or smooth, as may be desired. The said member is provided with a central retaining portion 19 which exactly fits into the angular valley mentioned, and integral portions 20 of the member 16 extend over the outer free faces of the members 17, said portions 20 terminating, however, short of the retaining flanges 5 and 10. It may therefore be said of the construction, that while the two base members form an angular valley into which an integral portion of the tread member extends, said tread member, on the other hand, is provided with two angular valleys arranged parallel to each other, into which the free angular edges of the base members extend.

The weight of the load tends to press the retaining portion 19 into firmer engagement with the base members, thus tending to crowd said members apart from each other, and forcing them into even firmer engagement with the flanges 5 and 10. At the same time the resilient functions of both base members and tread members will coöperate, the portions 20 of the tread member serving to maintain said tread member and base members in proper position and prevent the forcing of dirt, dust, mud or foreign substances into the joint between the tread and base members.

When the tread member 16 has become worn to such an extent that it is desired to replace the same, the rim-clamping bolts may be loosened and the adjustable member 8 of the rim removed, which will allow the removal of both base members and the tread member. A new tread member having been applied to the two base members, all three of said members may be slidably moved onto the rim and the adjustable member replaced and drawn up by the clamping bolts.

While I have thus disclosed the best mode in which I have contemplated embodying my invention, I do not desire to be limited to the details of form and construction shown and described, for it is evident that many changes may be made as circumstances require or experience suggests without departing from the spirit of the invention within the scope of the appended claims.

I claim:—

1. A vehicle tire comprising, in combination with the rim of a wheel, two base members arranged side by side upon the rim, a tread member provided with an integral extension adapted to fit between said base members and means for adjustably moving said base members together to retain said tread member in position with relation to said base members.

2. A vehicle tire comprising, in combination with the rim of a wheel, two base members of triangular-prism form arranged upon said rim and forming between them an angular valley extending around the wheel, a tread member provided with an integral extension adapted to exactly fit into said angular valley to retain said tread member in position with relation to said base members and means for adjustably moving said base members toward each other for the purpose of clamping said integral extension therebetween.

3. In a vehicle tire comprising, two parallel triangular-prism base members arranged side by side, and having free spaced angular edges, a tread member provided with angular grooves receiving said angular edges, said tread member also provided with an integral, triangular-prism retaining portion extending between said members and means for adjustably drawing said base members together for the purpose of clamping said integral, retaining portion therebetween.

4. A vehicle tire comprising, in combination with the felly of a wheel, a fixed tire provided with an annular retaining flange at one edge thereof, a movable tire provided with an annular retaining flange, said movable tire being adapted to be laterally moved upon the periphery of said fixed tire, a pair of parallel, triangular-prism base members arranged side by side upon said tires, said base members being retained between said retaining flanges, said base members forming between them an annular valley, a tread member provided with an integral retaining portion arranged within said angular valley and means for adjustably moving said movable tire upon said fixed tire, said base member being clamped between said retaining flanges.

In testimony that I claim the above, I have hereunto subscribed my name in the presence of two witnesses.

HENRY S. NUNAMAKER.

Witnesses:
  E. V. WERNICK,
  CHAS. F. KAUFFMAN.

Copies of this patent may be obtained for five cents each, by addressing the "Commissioner of Patents, Washington, D. C."